(12) United States Patent
Taucher

(10) Patent No.: US 8,474,440 B2
(45) Date of Patent: Jul. 2, 2013

(54) COOLANT-TO-CATALYST FUEL MODIFICATION METHOD AND APPARATUS

(76) Inventor: Scott Edward Taucher, Breckenridge, TX (US)

( * ) Notice: Subject to any disclaimer, the term of this patent is extended or adjusted under 35 U.S.C. 154(b) by 12 days.

(21) Appl. No.: 13/183,384

(22) Filed: Jul. 14, 2011

(65) Prior Publication Data

US 2012/0138024 A1 Jun. 7, 2012

Related U.S. Application Data

(60) Provisional application No. 61/364,132, filed on Jul. 14, 2010.

(51) Int. Cl.
*F02M 31/00* (2006.01)
(52) U.S. Cl.
USPC .......................................... 123/538; 123/557
(58) Field of Classification Search
USPC .................... 123/536–538, 543–557
See application file for complete search history.

(56) References Cited

U.S. PATENT DOCUMENTS

| | | | | |
|---|---|---|---|---|
| 4,091,782 A | * | 5/1978 | Dunnam | 123/557 |
| 4,092,967 A | * | 6/1978 | Haslett | 123/143 B |
| 4,218,999 A | * | 8/1980 | Shearer | 123/557 |
| 4,395,997 A | * | 8/1983 | Lee, Sr. | 123/557 |
| 4,406,270 A | * | 9/1983 | Simonson, Sr. | 123/557 |
| 4,454,841 A | * | 6/1984 | Reinhard et al. | 123/3 |
| 5,816,225 A | * | 10/1998 | Koch et al. | 123/538 |
| 6,024,073 A | * | 2/2000 | Butt | 123/538 |
| 6,276,346 B1 | * | 8/2001 | Ratner et al. | 123/538 |
| 6,817,347 B2 | * | 11/2004 | Noble | 123/536 |
| 6,915,789 B2 | * | 7/2005 | Ratner et al. | 123/538 |
| 2006/0243256 A1 | * | 11/2006 | Hornig | 123/536 |
| 2006/0260588 A1 | * | 11/2006 | Keiichiro et al. | 123/538 |
| 2007/0241033 A1 | * | 10/2007 | Stephenson | 208/299 |

FOREIGN PATENT DOCUMENTS

GB 2317921 A * 4/1998

OTHER PUBLICATIONS

Evaluation of the Greer Fuel Pre-Heater under Section 511 of the Motor Vehicle Information and Cost Savings Act by Edward Anthony Barth; May 1981 (57 pages).

* cited by examiner

*Primary Examiner* — M. McMahon
(74) *Attorney, Agent, or Firm* — Carter, DeLuca, Farrell & Schmidt, LLP

(57) ABSTRACT

A catalytic apparatus for efficient pre-combustion refinement of fossil fuel in vehicular engines, including an elongated outer metal pipe containing an elongated stainless steel inner tube of smaller diameter. The outer pipe is crimped or welded onto the inner tube to create a fuel chamber with connectors for the inflow and outflow of fossil fuel therethrough. The fuel chamber contains at least three catalytic elements each comprised of a different metal selected from the group Au, Cu, Ir, Ni, Pd, Pt, Zn and platiniridium, which may be electroplated small-pore screens. As engine coolant is diverted through the inner tube, excess heat is transferred to the inflowing fuel. The fuel is forced to flow in close proximity to the inner tube for maximum convection, and through the catalytic elements before flowing out through the fuel line to the fuel injectors for more efficient combustion.

Also disclosed is a method of pre-combustion fuel refinement consisting of the steps of transferring excess heat from engine coolant through a tube disposed through an inlet and outlet of a fuel chamber. In the chamber the heated fossil fuel is forced through the catalytic elements described before returning to the fuel line for injection and combustion.

13 Claims, 5 Drawing Sheets

COOLANT-TO-CATALYST FUEL MODIFICATION METHOD AND APPARATUS

PRIORITY

This application claims priority to a provisional United States patent application filed Jul. 14, 2010 under application Ser. No. 61/364,132

BACKGROUND OF THE INVENTION

1. Field of the Invention

The present disclosure relates to the field of fossil-fuel refinement for increased efficiency. More particularly it relates to a coolant-to-catalyst fuel modification system making more power from gasoline- and diesel-powered engines on the combustion stroke.

2. Background of the Invention

When an internal combustion engine is running some of the fuel ignites without generating power at the crankshaft. Fuel is introduced into an internal combustion engine in a liquid spray which does not burn optimally, creating more undesirable emissions. Longer hydrocarbon chains do not vaporize until late in the combustion process, if they vaporize at all in the combustion chamber. This is particularly the case at lower operating temperatures when the fuel is relatively cool.

Combustion performance increases with the heat of the fuel, increasing the ability of fuel to vaporize inside the intake manifold and within the cylinders. As an engine warms to operational temperatures, convection warms fuel incoming from the reservoir, but convection alone does not warm fuel sufficiently. Insufficiently or incompletely combusted fossil fuel results in the release of additional contaminants that are exhausted into catalytic converter and the atmosphere.

It is desirable, therefore, to increase the temperature of fuel to near engine-operating temperatures prior to combustion. It is desirable to do so without adding heat to the engine. It is thus desirable that excess heat in the engine coolant system be used to heat the fuel.

It is further desirable to catalyze fuel molecules for more efficient utilization earlier in the combustion process. It is still further desirable that fuel catalysis occur with a heated catalyst.

BRIEF SUMMARY OF THE INVENTION

The current disclosure teaches a novel coolant-to-fuel heat-exchanger and multistage catalyst apparatus and method. Wasted or unused heat in the engine coolant is redirected to heat the fuel and the catalyst inside the catalyst chamber prior to combustion. The result allows more fuel going into the engine to vaporize earlier. This enables more power from less fuel, as less fuel is wasted as heat in the exhaust or released as air pollutants.

In an embodiment of the disclosure, the heat-exchange catalyst includes an elongated metal tube, preferably of stainless steel. The metal coolant tube has a first end and a second end. The first end and second end are each removably connected to the heater hose of an internal combustion engine. The connection permits circulation of engine coolant or water therethrough without leakage or impeded flow. A full-volume of flow through the lumen of the coolant tube is necessary, but the direction of flow within the coolant tube is immaterial.

The coolant tube is disposed within an elongated outer metal pipe or "chamber tube". The outer chamber tube has a first end and a second end. The coolant tube is dimensioned longer than the length of the metal chamber tube such that the first end of the coolant tube extends outwardly from the first end of the metal chamber tube and the second end of the coolant tube extends outwardly from the second end of the metal chamber tube.

The elongated outer chamber tube is metal, preferably fabricated of black iron, mild steel or a manganese-based alloy. The first end and second end are crimped or welded to the inner coolant tube. Alternatively, end caps of approximately 0.187 to 0.20" thickness, containing a central aperture to permit the coolant tube to extend therethrough are welded onto the first end and second end of the outer chamber tube and to the coolant tube to form an impermeable seal. Other means to form an impermeable seal may be adapted.

The closed cavity formed between the inner circumference of the outer chamber tube, and the outer circumference of the inner coolant tube defines a fuel chamber. Apertures in the chamber tube wall allow fuel lines to be connected, permanently or threadably, for the circulation of fuel into and out of the fuel chamber. The direction of flow within the fuel chamber is immaterial. The preferred installation is in-line (i.e., no 90° "elbow" joints in close proximity to the heat-exchange catalyst unit).

Prior to crimping or welding at least one flow-control element and three catalytic element are installed in the fuel chamber. The flow-control elements are disposed upon the outer circumference of the coolant tube and extend perpendicularly therefrom until contact with the inner circumference of the outer chamber tube. The flow control element in a preferred embodiment comprises an internal disk, squash plate or washer. The disk is configured with an aperture dimensioned for a snug press-fit with the external circumference of the coolant tube.

The washer may be about 0.05 to 0.07" thickness and further comprise a plurality of divots of about ¼" about the aperture adjacent to the coolant tube force fuel to flow in a course adjacent to the coolant tube. By flowing proximally to the coolant tube, more heat is absorbed by the fuel.

Alternatively, spiral washers, "squirrels," or other configurations of internal flow-control or channeling means may be adapted to maximize the volume of fuel in close contact with the outer circumference of the coolant tube. Spiral washers may be formed by splitting at least two standard circular washers at the same radius, bending and welding the radial ends together such that a spiral is formed. Squirrels are defined as multiple washers with cutouts staggered such that flowing fuel swirls. Different types of flow-control elements may be mixed so long as the overall fuel flow is not degraded.

The purpose of the flow-control element or elements is to course fuel through the catalytic elements while keeping fuel in close proximity to the outer circumference of the coolant tube. This transfers more heat from the coolant tube to the fuel while the fuel is being catalyzed. As water or coolant flows through the coolant tube, heat is absorbed and conducted from the circulating coolant fluid into the fuel in the fuel chamber. Heat is also transferred into the outer chamber tube itself, further warming the fuel.

The fuel chamber is scalable to the amount of fuel that will flow therethrough in operation. The heat coolant tube and chamber tube are configured such that they may be connected in close proximity to the internal combustion engine to minimize heat loss. Multiple heat-exchange catalyst units may be "ganged" or arranged in a series. In some high-flow applications, a series of heat-exchange units may be preferred to fabricating an oversized heat-exchange catalyst as the increased size of the internal fuel chamber may not keep fuel in close enough proximity to the coolant tube to absorb sufficient heat. The heat contained in an conventional fossil-fuel system is insufficient to catalyze the fuel effectively through the catalyst members.

The internal fuel chamber is dimensioned so as to force fuel to flow through the catalytic elements in as close proximity to the outer coolant tube as possible without impeding the rate of fuel flow for which the engine is designed. The apertures or cutouts of the inner disks, squash plates, squirrels or washers must also be dimensioned to accommodate fuel flow rates, which may be up to about 500 gallons (1,893 liters) or more per hour in large engine installations.

The fuel chamber contains at least one catalyst member. The catalyst member comprises at least three catalytic elements. The catalytic elements are typically thin, electroplated metal 100×100 screens or sheets. The catalytic members are disposed within the fuel chamber. Each washer, spiral or similar flow-control element disposed between the outer surface of the coolant tube and the inner surface of the outer chamber tube divides the fuel chamber into sub-chambers: one washer creates two sub-chambers, two washers create three sub-chambers, etc. The catalyst members are segmented, preferably one set within each fuel sub-chamber.

The catalytic elements or screens are wrapped tightly around the coolant tube, but loosely enough to permit fuel to pass through the fuel chamber in contact with each sheet. The sheets are preferably perforated or screens to promote the flow of fuel. In a preferred embodiment, the screens are corrugated, waffled or otherwise crinkled to provide gaps therebetween, even when compressed within the fuel chamber or sub-chambers. Crinkling expands the space the catalytic elements occupy within the fuel chamber so more fuel is in contact with the elements.

Catalytic elements of copper (Cu), nickel (Ni) and zinc (Zn) are effective. These may be overlapped in any order (e.g., Cu—Ni—Zn, Cu—Zn—Ni, Ni—Zn—Cu, etc.). In preferred embodiment, additional screens of gold (Au) and palladium (Pd) increase effectiveness. The Au catalyst is typically 24-karat Au plated on Ni; the Pd catalyst is a plated Cu screen. The additional screens may also be placed in any order, but Pd adjacent to the coolant tube may impede effective welding. Optional catalyst elements include iridium (Ir) and platinum (Pt), or a platiniridium alloy. Electrical excitation of the catalyst improves efficiency at a lower temperature.

The disclosed heat-exchange catalyst units should be electrically grounded. Heat-exchange catalysts designed for smaller flows may be adapted with a stud for a grounding wire. This is because smaller units are designed to be installed in heater hoses which are typically electrically nonconductive. The connectors of larger heat-exchange catalyst units may be welded directly to the engine casting and are thus grounded. Larger units may incorporate handholds for ease of handling.

In use, heat-exchange catalyst applications range from smaller gasoline engines (e.g., motorcycle) to large horsepower producing engines (e.g., a 3,000 hp locomotive diesels), and may be adapted to even larger engines (e.g., 10,000 hp tugboat diesels). Gasoline-fueled engines typically operate in the range of 180° to 226° Fahrenheit (82° to 108° Celsius). Electric automotive radiator fans tend to activate at 226° F. to prevent a damaging increase in engine operating temperature. The circulating water or coolant fluids are the same temperature as the normal operating temperature of the engine when reached. Some newer engines and gasoline formulations may run a bit hotter without damaging the engine or the performance of the disclosed heat-exchange catalyst unit.

Diesel engines run somewhat cooler due to the recirculatory nature of the diesel fuel system. Thus the heat-exchange catalyst units may achieve more efficiency when installed in gasoline engines.

The heat-exchange catalyst should be installed in the fuel system such that fuel circulates through the catalyst for refinement before it reaches the fuel injectors. The apparatus has not been tested with carbureted fuel systems.

For clarity, the current disclosure should not be confused with fuel additives that are sometimes referred to as fuel "catalysts." Those are typically fluids to be introduced into the fuel reservoir or circulation system in order to alter or supplement the chemistry of the fuel as originally refined or as may have degraded by time or storage. The current disclosure increases the efficiency of combustion without adding chemicals or extraneous fluids to engine fuel.

The catalyst of the current disclosure also should not be confused with what is commonly known as an automotive "catalytic converter." Catalytic converters operate on the engine's exhaust. The current disclosure addresses catalysis of fuel prior to injection or combustion.

DETAILED DESCRIPTION OF THE INVENTION

Figure 1:
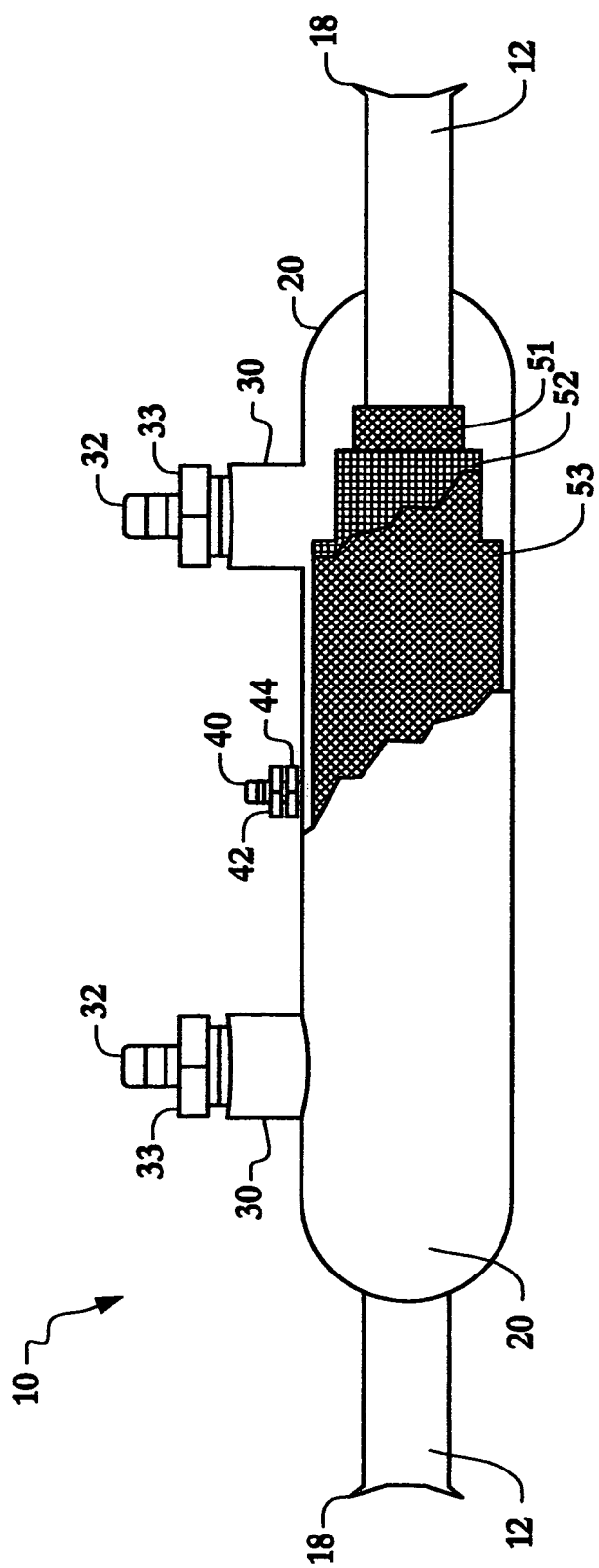
FIG. 1 illustrates an elevational view of the coolant-to-fuel heat-exchanger apparatus cut away to show the multistage catalyst elements.
Figure 2:
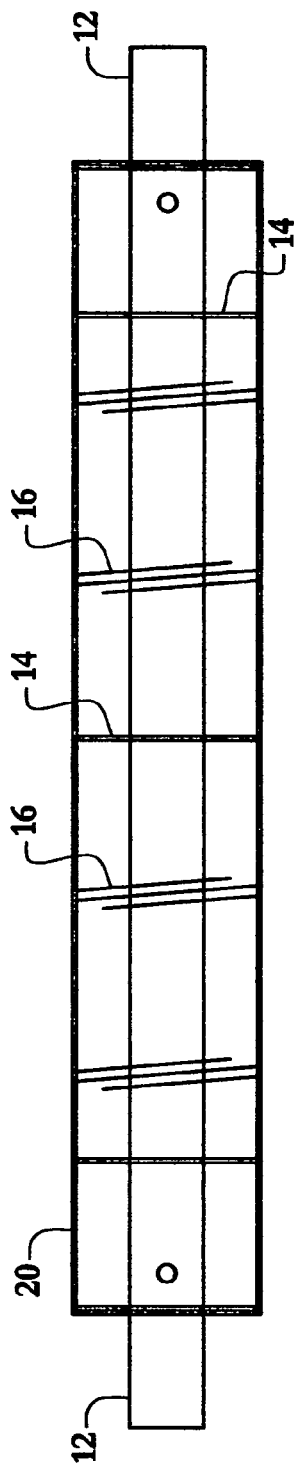
FIG. 2 illustrates an elevational cutaway view of the outer chamber tube showing the inner coolant tube with a plurality of flow-control members (squash plates and spirals) disposed thereon.
Figure 3:
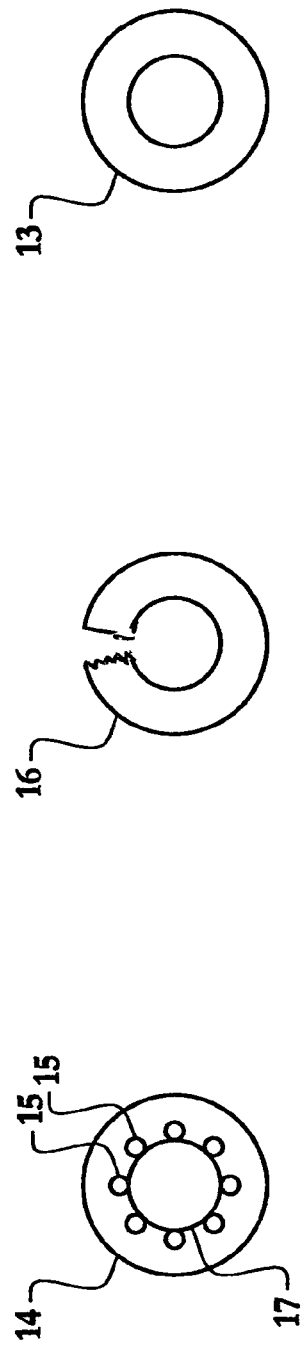
FIG. 3 illustrates a top view of end-washer 13, flow-control squash plate 14 with divots 15, central aperture 17 and spiral washer 16.
Figure 4:
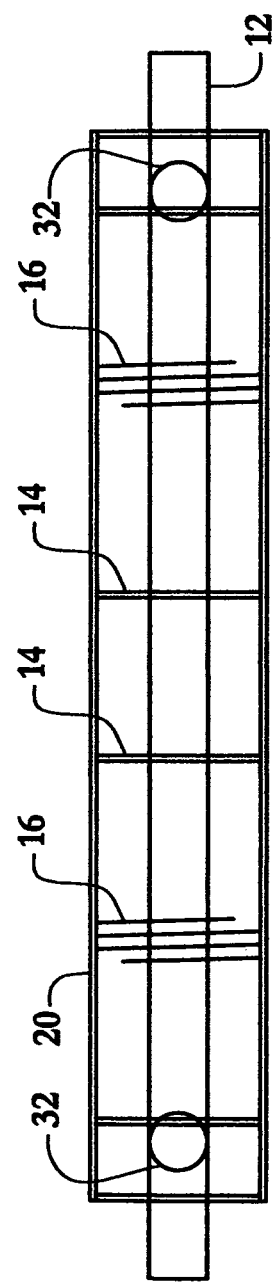
FIG. 4 illustrates a top cutaway view of the assembly of FIG. 2 showing the inner coolant tube extending outward from the first end and second end of the outer fuel pipe, welded thereto with an end cap (i.e., not crimped).

An exemplary embodiment taught by this disclosure, including the assembly steps follow. The embodiment comprises the following key members:
 a. ⅝" Stainless Steel inner tube 12;
 b. 1¼" Steel tubing outer catalyst chamber 20;
 c. ¼" NPT Steel coupling 30;
 d. Two ¼" NPT to ⁵⁄₁₆" hose barb fittings 32 and fastener 33;
 e. ¹⁰⁄₃₂ Stainless steel stud 40;
 f. ¹⁰⁄₃₂ Stainless steel nut 42;
 g. ¹⁰⁄₃₂ Stainless steel lock-washer or locking nut 44;
 h. A first proprietary metallic screen material with electroplated catalyst 51 from the group Cu, Ni and Zn;
 i. A second proprietary metallic screen material with electroplated proprietary catalyst 52 from the group Cu, Ni and Zn (not used before);

j. A third proprietary metallic screen material with electroplated proprietary catalyst 53 from the group Cu, Ni and Zn (not used before).

k. Optionally, at least one flow-control washer 14 with divots 15 adjacent to the central aperture 17, or a spiral washer 16 subassembly;

The electroplated metallic screens may be placed in any order. Optional additional electroplated catalyst screens (not shown) of Au, Pd, Ir, Pt or platiniridium may be added.

All the elements are necessary to known date for its function and operation. When different materials or dimensions are substituted for those specified in the preferred embodiment the desired function may be reduced or without effect in gasoline or diesel applications. The size of the ¼" NPT×5/16" hose barb for fuel inlet and outlet fittings can be adapted to fit different size fuel lines without any adverse affects to function of the device.

For other applications in heavier fuel oils such as diesel, additional catalyst are necessary and must be electroplated to an additional metallic screen substrate and installed prior to crimping and welding in the 1¼" outer catalyst chamber pipe. This additional part would be Part Number 11 electroplated with the additional proprietary catalyst necessary for heavier fuel oil applications and wrapped around part number 1 prior to parts number 8,9,10 being wrapped in sequence.

Part number 12: The stainless steel inner tube 12 cut to 8½" long and its function is to absorb and conduct the heat from the coolant into the outer chamber tube 20, a 1¼" steel pipe which is the catalyst fuel chamber housing the multistage catalyst 51, 52 and 53 (and optional, additional catalyst elements not shown). The stainless steel tube 12 is a pass through tube that connects to the heater hose of the vehicle's engine (not shown) by flares 18 at the first and second ends of inner tube 12, or welded flared 17 or threaded NPT 19 fittings.

Part Number 20 is the 1¼" outer steel tube or chamber 20 made of either steel or a manganese based pipe which comprises the catalyst fuel chamber. In this embodiment it is 6" long and may be crimped in a specially designed machine for this purpose then welded to the 5/8" stainless steel tubing 12. Two 0.375" holes are drilled into the 1¼ steel catalyst chamber tube 20 to accept couplings 30 for barb fittings 32, preferably brass.

Part number 30 are ¼" NPT couplings machined to fit the round radius of the steel fuel chamber tube 20 and then welded directly over the ¼" holes drilled in the steel fuel chamber tube (2).

Parts Number 40 are 10/32 stainless steel studs welded to outer catalyst chamber 20 to provide a grounding point once installed on the vehicle to eliminate static-electric build up, as well to ground any electrical activity from the interaction of the catalyst, fuel, and coolant flow.

Part Number 42 is a stainless steel nut to provide a bottom mating portion on the grounding stud 40.

Part Number 41 is a lock-washer or locknut or other fastener to provide a tightening and locking mechanism for the grounding point for the grounding connector to be attached to stainless steel stud 40 and bottom mating nut 42.

Parts Number 32 is a ¼" NPT to 5/16" hose barb brass fitting 32 installed into ¼" coupling 30 to provide an inlet for fuel and an outlet for treated fuel to be connected between the engine fuel line and fuel rail. These fittings can be changed to suit the application (for example on large diesel applications ¼" NPT to ½" hose barbs are required).

The next three parts 51, 52 and 53 are proprietary catalyst screen elements and synergistically work together to enhance one another's effect on the liquid hydrocarbon fuel. The following three elements may be wrapped in any order. A nominal sequence adjacent to the inner coolant tube is Ni, Zn and Cu.

Part Number 51: A first electroplated metallic catalyst screen element of Cu, Ni or Zn, cut to a length of 4⅞"×4" and wrapped around inner stainless coolant pipe 12.

Part number 52: A second electroplated metallic catalyst screen of Cu, Ni or Zn (not already wrapped in place), cut to the same length and wrapped around the first catalyst element (8).

Part Number 53: A third electroplated metallic catalyst screen element of Cu, Ni or Zn (not already wrapped in place), cut to the same length and wrapped around the first and second catalyst elements (8) and (9).

Optional fourth and fifth electroplated metallic catalyst screen elements (not shown) of Au and Pd, or alternatively or additionally Ir, Pd and/or platiniridium may be employed. When flow control squash washers 14, spiral washers 16 or the like are disposed, the catalyst elements 51, 52 and 53 may be segmented and placed therebetween.

The heat-exchange and catalyst apparatus works by employing the heat in the coolant by intersecting a coolant heat source from the coolant hose on the engine to activate a multistage catalyst in the catalyst chamber. When the fuel is passed through the catalyst fuel chamber it absorbs some of the heat while simultaneously interacting with catalyst to break larger hydrogen/carbon chains so the fuel burns better in the engine. The arrangement, weight, pore size of the screening order of the catalyst is all integral to its designed function:

Catalytic metallic screen element 51 of a typical 100×100 hole size is electroplated with catalyst Cu, Ni or Zn works in conjunction with and enhances the effects of catalyst elements 52 and 53, each plated with a different metal from each other.

The grounding stud 40 prevents any static electricity that may build up from the coolant and the interaction of the catalyst with the fuel. The 10/32 nut 42 is a base for a grounding terminal and the 10/32 locking nut 41 is the clamping nut that holds grounding terminal in place. The two ¼" NPT to 5/16" brass barb fittings 32 are conduits to route fuel into and out of the apparatus.

Once the materials arrive the 1¼" pipe 20 must be cut to a preferable length of 6" on a cut off saw using a steel cutting blade. The 5/8" stainless steel pipe 12 must also be cut to a preferred length of 8½" The materials must be cleaned after every step of the manufacturing process. After the pipes 12, 20 are cut each side must be deburred on a belt sander on the outer rim. The inside rim of the pipes must be deburred using a grinding tool with a cone tapered grinding stone or cone tapered steel grinding or milling bit.

The next step is to drill the chamber pipe 20 using a 0.375" end mill bit in a milling machine drilling the hole 1¼" from the first end and second end of pipe 20 directly opposing and in line with one another. The 3/32" stainless grounding stud 40 can now be welded in place using a stud spot-welder. The pipes 12 and 20 must be thoroughly cleaned such as with soap, warm water and a scrub brush then dried thoroughly before having the catalyst elements 51, 52 and 53 installed. The catalyst impregnated screens 51, 52 and 53 after being electroplated and cut to size should be wrinkled in a machine designed for this purpose. The wrinkling enhances the catalyst effect by ensuring tighter contact of the elements 51, 52 and 53 to one another as well as taking up space and contacting the inner wall of the fuel catalyst chamber 20. After the wrinkling is complete the catalyst screens 51, 52 and 53 can then be wrapped around the inner pipe 12 and inserted into the 1¼" catalyst pipe 20 assembly.

In a preferred embodiment, at least one squash washer 14 with divot array 15 or spiral washers 16 are flushly disposed upon and perpendicular to inner coolant tube 12 and extending outward therefrom through the fuel chamber formed between said tube 12 and the inner wall of outer catalyst chamber 20. This directs the flow of fuel into close contact with coolant tube 12 and thus transfers more heat into the fuel as it flows through catalytic elements 51, 52 and 53 (and optional others). Catalytic elements 51, 52 and 53 (and any optional others) may be cut to fit flushly within the subchambers formed between each such flow control element 14 or 16.

Specially fabricated jigs and dies were built to compress the 1¼" pipe 20 assembly to the proper sized radius and tolerances so they can be properly welded. The ¼" NPT bungs must be radiused in a jig designed to hold them on a mill table and radiused using a ½" ball end mill and then deburred, the radius matches the radius of the 1¼" catalyst pipe 20 assembly. The bungs 30 must be welded on first to prevent the 0.375" holes from collapsing in the crimping tool. Upon completion of inserting the inner pipe 12 and catalyst after the bungs are welded, the entire assembly can now be crimped in the specially designed crimping tool made for this purpose.

After the crimping is complete the assembly 10 must be wiped down with a solvent to remove any residue and oils from the crimping tool. The first and second ends of chamber 20 can now be welded fusing the 1¼" catalyst chamber pipe 20 to the ⅝" stainless inner pipe 12. The welded assembly is then checked for leaks by plugging one side and inserting an air chuck and air hose in the other and applying 100 PSI of compressed air to the assembly while simultaneously submerging the assembly under water to verify there are no leaks at any of the welds.

Once the welding is complete the assembly can now be dried off thoroughly re-cleaned with the solvent and then powder coated using an industry standard powder coating gun color to be determined by a standard batch color or by customer special request then baked in an oven to cure the powder coat to the desired finish. After the powder coating process is complete the ¼" NPT to 5/16" hose fittings 17 or 19 can now be installed on the first end and second end of inner coolant tube 12 or else flared 18 prior to packaging.

In an optional or larger embodiment, in place of crimping, an end plate 13 is with a central aperture is slipped over the first end and second end of the inner coolant tube 12 and welded thereto and to each of the first end and the second end of the outer catalyst chamber 20 perpendicular to the inner coolant tube 12. Threadable or other connections may be employed such that the resulting inner fuel chamber (seen in cutaway in FIG. 1) formed between the exterior circumference of inner tube 12 and the inner wall of catalyst chamber pipe 20 is impermeable to fluid leakage when fittings 32 are sealed or connected to engine fuel lines (not shown).

Figure 5:
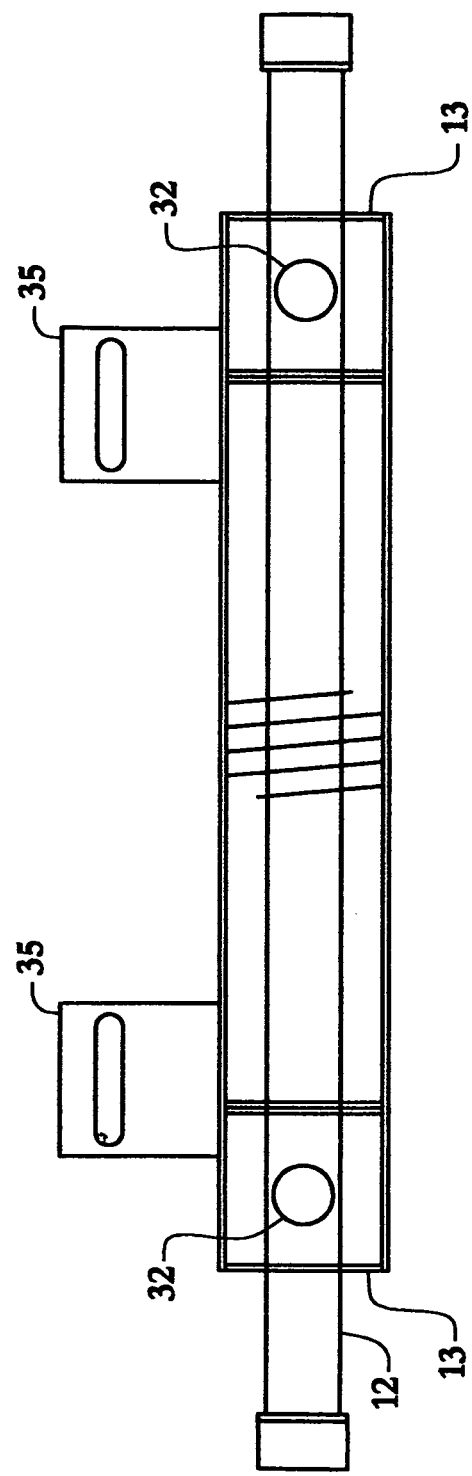
FIG. 5 is the top cutaway view of FIG. 4, further depicting slotted mounting brackets and welded NPT fittings for the inner coolant pipe.
Figure 6:
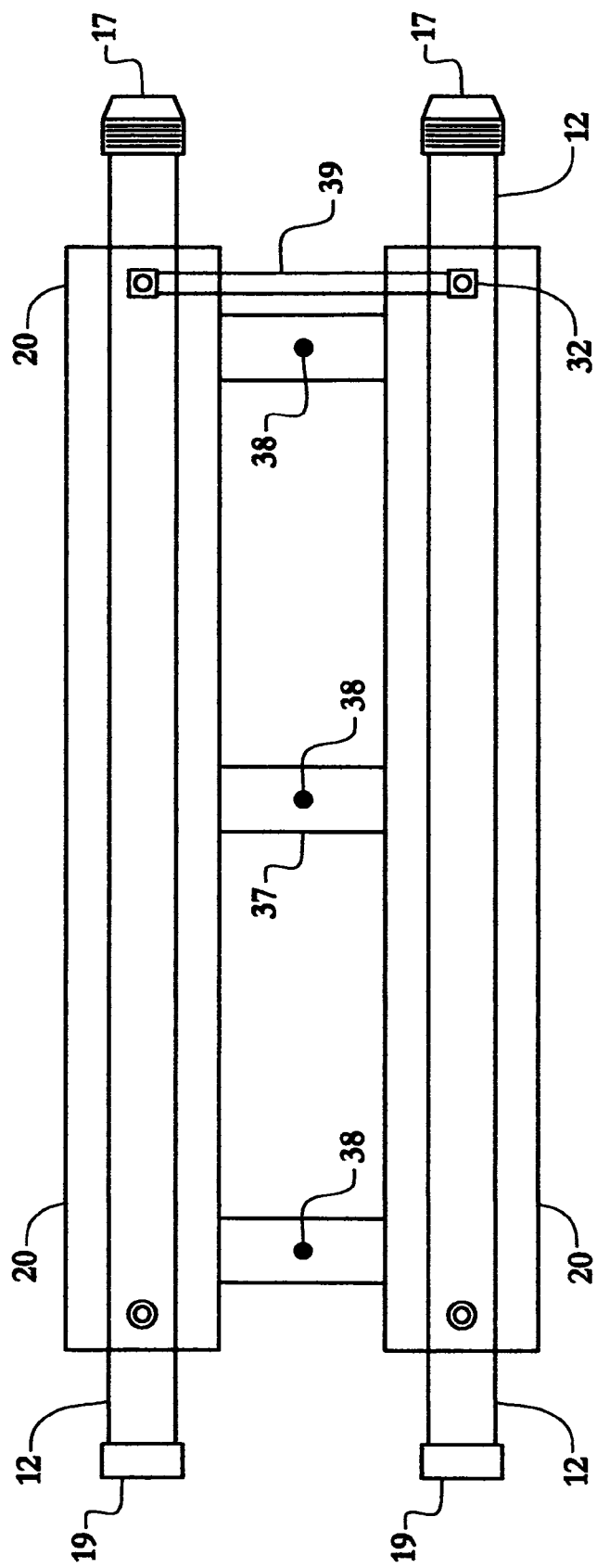
FIG. 6 is a top elevational view of the a linked arrangement of heat-exchange catalytic apparatuses (without coolant connecting hose and clamp) with one fuel line and a plurality of mounting bars therebetween, and an optional flared fitting welded onto one end of inner coolant tubes.

In other embodiments, the flared end 18 of inner coolant tube 12 may be replaced with a ¾" or ⅝" female NPT fitting 19 as depicted in FIG. 5 to accommodate threadable connection to an engine coolant circulating system (not shown). In the further alternative, and preferably where multiple apparatuses 10 are to be linked together in a series as depicted in FIG. 6, a flared fitting or boss 17 suitable for threadable or frictional attachment of flexible heater hoses bound with a hose clamp (not shown). Coolant connector conduits or hoses are affixed or clamped to fittings 17, 18 or 19 so that coolant flows from apparatus 10 to apparatus 10 in sequence. In the same way fuel connector conduits 39 are affixed to fittings 32 so that fuel flows from apparatus 10 to apparatus 10 in sequence for successive catalyzation.

In such linked embodiment, at plurality of apparatuses 10 are mounted with optional bottom mounting bars 37 and/or a top mounting clamp (not shown) may be affixed or welded to the outer chamber body 20 as depicted in FIG. 6.

Bottom mounting bar 37 may include an aperture 38 for a fastener to affix the assembly to a mounting bracket or engine member (not shown) in addition or alternative to slotted bracket 35 (FIG. 5). Inner coolant tubes 12 of each apparatus 10 are connected to each other with hoses clamped or fitted to one end of each tube 12 to permit coolant to flow through each apparatus 10 in sequence.

In operation, the apparatus 10 normally is installed in the ⅝" or ¾" heater hose lines that are found on most vehicles. The heater hose would have to be intersected by either cutting it or removing from one side of its connection preferably where it comes off the engine on its way to the heater core, and connecting it to the ⅝" flared pipe of the assembly. Then a hose would have to be installed on the other side of the assembly back towards the heater core of the vehicle, where the hoses are connected both ends of the hose must be tightened down using a #10 hose clamp. The fuel line from the vehicle must be removed and using the quick connect tubing inserted into the factory fuel line and using the fuel line that comes with the kit, install the quick connect tubing and clamped using the provided 5/16" hose clamp, after it is installed and route the other end to one side of the assembly installing it onto the brass 5/16" hose barb. The embodiment includes adapters to fit most applications; however, additional hardware may have to be purchased from an auto-parts or hardware store for nonstandard installations which will be apparent to those skilled in the art. Optional slotted mounting brackets 35 may be welded or otherwise affixed to the outer chamber 20 to facilitate mounting.

This apparatus can be used in power generation system that run on diesel fuel, locomotive train engines, heavy equipment, industrial equipment, farm machinery, air transportation planes and vehicles at airports, ocean liners and cargo ships.

Thus the reader will recognize that at least one embodiment of the heat-exchange catalyst is readily adaptable to a variety of widely employed gasoline and diesel engines. In operation the disclosed heat-exchange catalyst unit and the method thereof results in lower exhaust emissions and operating costs by providing more power and fuel economy.

The foregoing description, for purposes of explanation, specific numbers, materials and configurations are set forth in order to provide a thorough understanding of the present invention. However, it will be apparent to one skilled in the art that the present invention may be practiced without the specific details, which should not be construed as limitations on the scope, but rather as exemplifications of preferred embodiments thereof.

In other instances, well known features are omitted or simplified in order not to obscure the present invention. Furthermore, for ease of understanding, certain method steps are delineated as separate steps, however, these separately delineated steps should not be construed as necessarily order dependent in their performance.

Accordingly, the scope should not be determined by the embodiments or steps discussed or illustrated, but rather by the appended claims and their lawful equivalents.

What is claimed is:

1. A catalytic apparatus for efficient combustion of fossil fuel in vehicular engines, comprising:

i. an elongated pipe, having a first end and a second end,
ii. an elongated tube, having a first end for inflow of engine coolant and a second end for outflow of said engine coolant,
iii. said tube being disposed within said pipe, said first end and said second end of said tube extending outwardly from said first end and said second end of said pipe, said first end and said second end of said pipe being impermeably connected to said first end and said second end of said tube forming a chamber therein,
iv. said pipe further comprising a first fuel-line connector for inflow of said fossil fuel and a second fuel-line connector for outflow of said fossil fuel through a chamber formed between the outer surface of said tube and inner surface; and
v. said chamber including at least three catalytic elements each comprised of a different metal selected from the group Au, Cu, Ir, Ni, Pd, Pt, Zn and platiniridium,
vi. said first catalytic element, said second catalytic element and said third catalytic element being wrapped together in any sequence around the outer surface of said tube within said chamber such that said fossil fuel flows through each of said first catalytic element, said second catalytic element and said third catalytic element.

2. The apparatus of claim 1, wherein said metal is electroplated on at least one said catalytic element.

3. The apparatus of claim 1, wherein said at least one said catalytic element is a metallic screen.

4. The apparatus of claim 1, further including at least one flow control member disposed upon the outer surface of said tube and extending essentially perpendicularly therefrom within said chamber to the inner wall of said pipe, defining at least two fuel sub-chambers.

5. The apparatus of claim 2, wherein said catalytic elements are dimensioned to fit within said sub-chambers.

6. The apparatus of claim 1, wherein said first end of said tube is flared.

7. The apparatus of claim 1, wherein said second end of said tube is flared.

8. The apparatus of claim 1, wherein said first end of said tube further includes a welded fitting for attachment to a coolant hose.

9. The apparatus of claim 1, wherein said second end of said tube further includes a welded fitting for attachment to a coolant hose.

10. The apparatus of claim 1, wherein at least one other said apparatus is linked thereto in a series, further including at least one fuel conduit and at least one coolant conduit, the at least one fuel conduit and the at least one coolant conduit impermeably disposed between said apparatuses.

11. The apparatuses of claim 10, further including at least one mounting bar affixed thereto such that said apparatuses remain in fixed proximity.

12. The apparatuses of claim 11, further including at least one aperture in said at least one mounting bar for the attachment of said apparatuses with fasteners.

13. The apparatus of claim 1, further including at least one slotted mounting bracket on the outer surface of said pipe for the attachment of said apparatus with fasteners.

* * * * *